United States Patent
Sugimoto

(10) Patent No.: US 8,616,255 B2
(45) Date of Patent: Dec. 31, 2013

(54) POLYMER LAMINATE AND PNEUMATIC TIRE USING THE SAME AS INNER LINER

(75) Inventor: Mutsuki Sugimoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 243 days.

(21) Appl. No.: 12/797,125

(22) Filed: Jun. 9, 2010

(65) Prior Publication Data

US 2011/0056604 A1 Mar. 10, 2011

(30) Foreign Application Priority Data

Sep. 4, 2009 (JP) ................................ 2009-205039

(51) Int. Cl.
*B60C 5/14* (2006.01)

(52) U.S. Cl.
USPC .................... 152/510; 152/DIG. 16; 523/166

(58) Field of Classification Search
USPC ........... 152/502–510, DIG. 16; 428/336, 343; 523/166
See application file for complete search history.

(56) References Cited

U.S. PATENT DOCUMENTS

| | | | |
|---|---|---|---|
| 4,946,899 A | | 8/1990 | Kennedy et al. |
| 5,219,948 A | | 6/1993 | Storey et al. |
| 2004/0031550 A1 | | 2/2004 | Kanenari et al. |
| 2008/0249236 A1 | | 10/2008 | Nakashima et al. |
| 2008/0286571 A1 * | | 11/2008 | Ichimura et al. .......... 428/355 R |
| 2009/0291298 A1 * | | 11/2009 | Robert et al. ................ 428/336 |
| 2010/0051158 A1 | | 3/2010 | Albert et al. |
| 2010/0175804 A1 | | 7/2010 | Lesage et al. |
| 2010/0263778 A1 | | 10/2010 | Lesage et al. |
| 2010/0294411 A1 * | | 11/2010 | Custodero et al. ............ 152/511 |
| 2012/0003413 A1 * | | 1/2012 | Lesage et al. ................ 428/36.6 |

FOREIGN PATENT DOCUMENTS

| | | | |
|---|---|---|---|
| EP | 0 206 756 A2 | | 12/1986 |
| EP | 1674432 A1 | | 6/2006 |
| FR | 2917010 | * | 12/2008 |
| FR | 2918669 A1 | | 1/2009 |
| FR | 2939076 | * | 6/2010 |
| JP | 62-48704 A | | 3/1987 |
| JP | 64-62308 A | | 3/1989 |
| JP | 3-174403 A | | 7/1991 |
| JP | 6-107896 A | | 4/1994 |

(Continued)

OTHER PUBLICATIONS

Koshimura et al., "Application study of styrene-isobutylene-styrene block copolymer as a new thermoplastic elastomer," Polymer Bulletin, vol. 29, 1992, pp. 705-711.

(Continued)

*Primary Examiner* — Justin Fischer
*Assistant Examiner* — Robert Dye
(74) *Attorney, Agent, or Firm* — Birch, Stewart, Kolasch & Birch, LLP

(57) ABSTRACT

An object of the present invention is to provide a polymer laminate that has a small thickness and is excellent in air permeation resistance and adhesion with an adjacent rubber, and a pneumatic tire using the same as an inner liner. A polymer laminate includes a first layer having a thickness of 0.05 mm to 0.6 mm made of a styrene-isobutylene-styrene triblock copolymer, and a second layer containing at least one of a styrene-isoprene-styrene triblock copolymer and a styrene-isobutylene diblock copolymer, and a second layer have a thickness of 0.01 mm to 0.3 mm.

4 Claims, 2 Drawing Sheets

(56) References Cited

FOREIGN PATENT DOCUMENTS

| | | | |
|---|---|---|---|
| JP | 9-165469 | A | 6/1997 |
| JP | 10-508888 | A | 9/1998 |
| JP | 2005-344030 | A | 12/2005 |
| JP | 2007-291256 | A | 11/2007 |
| JP | 2009-149711 | A | 7/2009 |
| JP | 2010-513121 | A | 4/2010 |
| WO | WO 96/15156 | A2 | 5/1996 |
| WO | WO 03/029029 | A1 | 4/2003 |
| WO | WO 2005/033035 | A1 | 4/2005 |
| WO | WO 2006/001680 | A1 | 1/2006 |
| WO | WO 2008/145276 | A1 | 12/2008 |
| WO | WO 2008/145277 | A1 | 12/2008 |
| WO | WO 2008/154996 | A1 | 12/2008 |
| WO | WO 2010/063426 | A1 | 6/2010 |
| WO | WO 2010/063427 | A1 | 6/2010 |

OTHER PUBLICATIONS

Puskas et al., "The effect of hard and soft segment composition and molecular architecture on the morphology and mechanical propeties of polystyrene-polyisobutylene thermoplastic elastomeric block copolymers," European Polymer Journal, vol. 39, 2003, pp. 2041-2049.

DEXCO, "VECTOR 4211" Styrene-Isoprene-Styrene (SIS) Block Copolymer; DEXCO Polymer, Apr. 2012; 2 pages.

Kaneka, Thermoplastic Elastomer; SIBSTAR "Wholly Saturated" Styrene-Isobutylene Block Copolymer; Oct. 4, 2007; 2 pages.

KRATON, "Fiche de donnees de securite. Produits de la gamme styrene-isoprene-styrene"; KRATON Polymers, Feb. 2, 2009; pp. 1-8.

KRATON, "Grade Range"; KRATON Polymers, Apr. 2001; 10 pages.

* cited by examiner

POLYMER LAMINATE AND PNEUMATIC TIRE USING THE SAME AS INNER LINER

This nonprovisional application is based on Japanese Patent Application No. 2009-205039 filed on Sep. 4, 2009 with the Japan Patent Office, the entire contents of which are hereby incorporated by reference.

BACKGROUND OF THE INVENTION

1. Field of the Invention

The present invention relates to a polymer laminate, and a pneumatic tire using the same as an inner liner.

2. Description of the Background Art

Recently, an attempt has been made to perform weight saving of tires because of strong social demands for fuel economy of automobiles. An attempt has also been made to perform weight saving of inner liners, among tire members, that are disposed inside tires and have the function of improving air permeation resistance by decreasing the amount of air leaked to the outside from the inside of pneumatic tires (air permeation amount).

In a rubber composition for an inner liner, an improvement in air permeation resistance of tires is performed by using a butyl rubber-based rubber formulation containing 70 to 100% by mass of a butyl rubber and 30 to 0% by mass of a natural rubber. The butyl rubber-based rubber formulation contains, in addition to butylenes, about 1% by mass of isoprene, that enables crosslinking between rubber molecules along with sulfur, a vulcanization accelerator and zinc white. In the case of a conventional formulation, the butyl-based rubber requires the thickness of about 0.6 to 1.0 mm for tires for passenger cars, or the thickness of about 1.0 to 2.0 mm for trucks and buses. In order to perform weight saving of tires, there is proposed a polymer that is excellent in air permeation resistance as compared with the butyl-based rubber, and can further decrease the thickness of an inner liner layer.

Japanese Patent Laying-Open No. 2007-291256 proposes, as a pneumatic tire that can simultaneously realize suppression of air pressure drop, improvement in durability and improvement in fuel efficiency, a pneumatic tire using a rubber composition for an inner liner, containing an ethylene-vinyl alcohol copolymer represented by the following general formula (I):

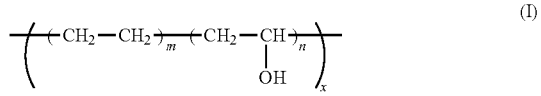

wherein m and n are each independently from 1 to 100 and x is from 1 to 1000, in the amount within a range from 15 to 30 parts by mass based on 100 parts by mass of a rubber component composed of a natural rubber and/or a synthetic rubber in an inner liner layer. However, the technique of Japanese Patent Laying-Open No. 2007-291256 leaves room for improvement in respect of weight saving of tires since a rubber sheet using the rubber composition has a thickness of 1 mm.

Japanese Patent Laying-Open No. 09-165469 proposes a pneumatic tire in which adhesion between an inner liner and a rubber composition constituting the inner surface of the tire or a carcass layer is improved by forming an inner liner layer using nylon with low air permeability. However, the technique of Japanese Patent Laying-Open No 09-165469 has a problem that a rubber cement composed of a rubber composition must be bonded after subjecting a nylon film to an RFL treatment so as to form a nylon film layer, resulting in complicated steps. Furthermore, in a vulcanization step, there is usually employed a tire vulcanization method wherein a bladder body is inserted into an unvulcanized tire (green tire) accommodated in a mold and expanded, and then vulcanization molding is performed by pressing the tire against the inner surface of the mold from the inside of the unvulcanized tire. However, there is also a problem in Japanese Patent Laying-Open No. 09-165469 that the nylon film layer is contacted with the bladder in a heated state and thus the nylon film layer is adhered and bonded to the bladder, resulting in breakage in the inner liner layer.

SUMMARY OF THE INVENTION

An object of the present invention is to provide a polymer laminate that has a small thickness and is excellent in air permeation resistance and adhesion with an adjacent rubber, and a pneumatic tire using the same as an inner liner.

The present invention provides a polymer laminate including: a first layer having a thickness of 0.05 mm to 0.6 mm made of a styrene-isobutylene-styrene triblock copolymer, and a second layer containing at least one of a styrene-isoprene-styrene triblock copolymer and a styrene-isobutylene diblock copolymer, wherein the second layer has a thickness of 0.01 mm to 0.3 mm.

In the polymer laminate according to the present invention, it is preferable that the styrene-isobutylene-styrene triblock copolymer has a weight average molecular weight of 50,000 to 400,000, and also has a styrene unit content of 10 to 30% by mass.

In the polymer laminate according to the present invention, it is preferable that the styrene-isoprene-styrene triblock copolymer has a weight average molecular weight of 100,000 to 290,000, and also has a styrene unit content of 10 to 30% by mass.

In the polymer laminate according to the present invention, it is preferable that the styrene-isobutylene diblock copolymer is linear and has a weight average molecular weight of 40,000 to 120,000, and also has a styrene unit content of 10 to 35% by mass.

The present invention also provides a pneumatic tire using, as an inner liner, a polymer laminate including a first layer having a thickness of 0.05 mm to 0.6 mm made of a styrene-isobutylene-styrene triblock copolymer, and a second layer containing at least one of a styrene-isoprene-styrene triblock copolymer and a styrene-isobutylene diblock copolymer, wherein the second layer has a thickness of 0.01 mm to 0.3 mm.

In the pneumatic tire according to the present invention, it is preferable that the second layer is disposed on a tire radial outer surface in the polymer laminate.

According to the present invention, it is possible to obtain a polymer laminate that has a small thickness and is excellent in air permeation resistance and adhesion with an adjacent rubber, and a pneumatic tire using the same as an inner liner.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
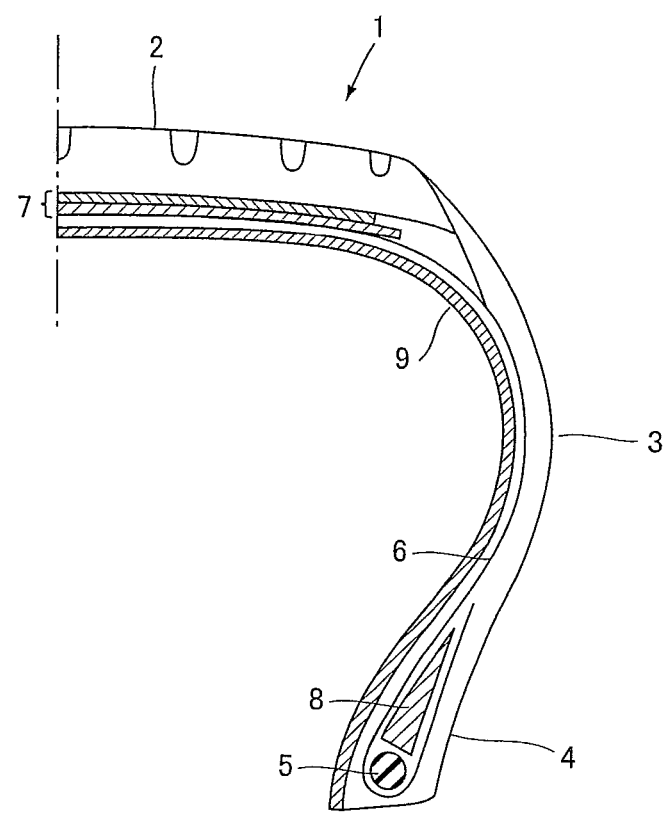
FIG. 1 is a schematic sectional view showing the right half of a pneumatic tire in one embodiment of the present invention.

In one embodiment of the present invention, a polymer laminate includes a first layer having a thickness of 0.05 mm to 0.6 mm made of a styrene-isobutylene-styrene triblock copolymer, and a second layer containing at least one of a styrene-isoprene-styrene triblock copolymer and a styrene-isobutylene diblock copolymer, and the second layer has a thickness of 0.01 mm to 0.3 mm.

<First Layer>

In one embodiment of the present invention, the first layer is made of a styrene-isobutylene-styrene triblock copolymer.

Because of an isobutylene block of an SIBS, a polymer film made of the SIBS has excellent air permeation resistance. Therefore, when a polymer film made of an SIBS is used as an inner liner, a pneumatic tire having excellent air permeation resistance can be obtained.

Furthermore, the SIBS has excellent durability since a molecular structure other than those of aromatic molecules is completely saturated and therefore deterioration and hardening are suppressed. Therefore, when a polymer film made of an SIBS is used as the inner liner, a pneumatic tire having excellent durability can be obtained.

When a pneumatic tire is produced by using a polymer film made of an SIBS as an inner liner, a halogenated rubber having high specific gravity, which has hitherto been used so as to impart air permeation resistance, such as a halogenated butyl rubber, is not used in order to ensure air permeation resistance by the addition of the SIBS. Also when the halogenated rubber is used, it is possible to decrease the amount of use. Therefore, weight saving of the tire can be performed and the effect of improving fuel efficiency can be obtained.

Although there is no particular limitation on the molecular weight of the SIBS, the weight average molecular weight obtained by the GPC measurement is preferably from 50,000 to 400,000 in view of fluidity, the molding step and rubber elasticity. When the weight average molecular weight is less than 50,000, tensile strength and tensile elongation may decrease. In contrast, when the weight average molecular weight is more than 400,000, extrusion moldability may deteriorate. Therefore, both cases are not preferred.

The SIBS usually contains 10 to 40% by mass of a styrene unit. Since air permeation resistance and durability become more satisfactory, the content of the styrene unit in the SIBS is preferably from 10 to 30% by mass.

In the SIBS, a molar ratio of an isobutylene unit to a styrene unit (isobutylene unit/styrene unit) is preferably from 40/60 to 95/5 in view of the rubber elasticity of the copolymer. In the SIBS, the polymerization degree of each block is preferably from about 10,000 to 150,000 for an isobutylene block, or preferably from about 5,000 to 30,000 for a styrene block, in view of the rubber elasticity and handling (when the polymerization degree is less than 10,000, a liquid is obtained).

The SIBS can be obtained by a conventional polymerization method of a vinyl-based compound and, for example, it can be obtained by a living cationic polymerization method.

For example, Japanese Patent Laying-Open No, 62-048704 and Japanese Patent Laying-Open No, 64-062308 disclose that living cationic polymerization of isobutylene with other vinyl compounds can be performed and a polyisobutylene-based block copolymer can be produced by using isobutylene and other compounds as the vinyl compound. In addition, the method for production of a vinyl compound polymer by a living cationic polymerization method is described, for example, in U.S. Pat. Nos. 4,946,899, 5,219,948 and Japanese Patent Laying-Open No. 03-174403.

The SIBS does not have a double bond other than an aromatic double bond in the molecule and has high stability to ultraviolet rays as compared with a polymer having a double bond in the molecule, for example, polybutadiene, and therefore has satisfactory weatherability. Furthermore, although it does not have a double bond in the molecule and is a saturated rubbery polymer, a refractive index (nD) at 20° C. of light having a wavelength of 589 nm is 1.506, as described in Polymer Handbook, Willy, 1989.

This is significantly higher than that of other saturated rubbery polymers, for example, an ethylene-butene copolymer.

The thickness of a first layer made of the SIBS is from 0.05 to 0.6 mm. When the thickness of the first layer is less than 0.05 mm, the first layer may be broken by a pressing pressure upon vulcanization of a green tire in which a polymer laminate is used as an inner liner, and thus an air leak phenomenon may occur in the resultant tire. In contrast, when the thickness of the first layer is more than 0.6 mm, tire weight increases and fuel efficiency deteriorates. The thickness of the first layer is more preferably from 0.05 to 0.4 mm.

The first layer can be obtained by forming the SIBS into a film by a conventional method of forming a thermoplastic resin or a thermoplastic elastomer into a film, such as extrusion molding or calender molding.

<Second Layer>

In one embodiment of the present invention, the second layer includes at least one of an SIS layer made of a styrene-isoprene-styrene triblock copolymer (hereinafter may also be referred to as an SIS) and an SIB layer made of a styrene-isobutylene diblock copolymer (hereinafter may also be referred to as an SIB).

(Styrene-Isoprene-Styrene Triblock Copolymer)

Since an isoprene block of an SIS is a soft segment, a polymer film made of an SIS is easily vulcanization-bonded with a rubber component. Therefore, when the polymer film made of an SIS is used as the inner liner, the inner liner is excellent in adhesion with an adjacent rubber constituting a carcass or an insulation, and thus a pneumatic tire having excellent durability can be obtained.

Although there is no particular limitation on the molecular weight of the SIS, the weight average molecular weight obtained by the GPC measurement is preferably from 100,000 to 290,000 in view of rubber elasticity and moldability. When the weight average molecular weight is less than 100,000, tensile strength may decrease. In contrast, when the weight average molecular weight is more than 290,000, extrusion moldability may deteriorate. Therefore, both cases are not preferred.

The content of a styrene unit in the SIS is preferably from 10 to 30% by mass in view of tackiness, adhesion and rubber elasticity.

In the SIS, a molar ratio of an isoprene unit to a styrene unit (isoprene unit/styrene unit) is preferably from 90/10 to 70/30. In the SIS, the polymerization degree of each block is preferably from about 500 to 5,000 for an isoprene block, or preferably from about 50 to 1,500 for a styrene block, in view of the rubber elasticity and handling.

The SIS can be obtained by a conventional polymerization method of a vinyl-based compound and, for example, it can be obtained by a living cationic polymerization method.

The SIS layer can be obtained by forming an SIS into a film by a conventional method of forming a thermoplastic resin or a thermoplastic elastomer into a film, such as extrusion molding or calender molding.

(Styrene-Isobutylene Diblock Copolymer)

Since an isobutylene block of an SIB is a soft segment, a polymer film made of an SIB is easily vulcanization-bonded with a rubber component. Therefore, when the polymer film made of an SIB is used as the inner liner, the inner liner is excellent in adhesion with an adjacent rubber constituting a carcass or an insulation, and thus a pneumatic tire having excellent durability can be obtained.

It is preferred to use a linear one as the SIB in view of rubber elasticity and adhesion.

Although there is no particular limitation on the molecular weight of the SIB, the weight average molecular weight obtained by the GPC measurement is preferably from 40,000 to 120,000 in view of rubber elasticity and moldability. When the weight average molecular weight is less than 40,000, tensile strength may decrease. In contrast, when the weight average molecular weight is more than 120,000, extrusion moldability may deteriorate. Therefore, both cases are not preferred.

The content of a styrene unit in the SIB is preferably from 10 to 35% by mass in view of tackiness, adhesion and rubber elasticity.

In the SIB, a molar ratio of an isobutylene unit to a styrene unit (isobutylene unit/styrene unit) is preferably from 90/10 to 65/35. In the SIB, the polymerization degree of each block is preferably from about 300 to 3,000 for an isobutylene block, or preferably from about 10 to 1,500 for a styrene block, in view of the rubber elasticity and handling.

The SIB can be obtained by a conventional polymerization method of a vinyl-based compound and, for example, it can be obtained by a living cationic polymerization method.

For example, International Publication No. WO 2005/033035 discloses a production method in which methylcyclohexane, n-butyl chloride and cumyl chloride are charged in a stirrer, cooled to −70° C. and reacted for 2 hours, and then the reaction is terminated by adding a large amount of methanol and the reaction product is vacuum-dried at 60° C. to obtain an SIB.

The SIB layer can be obtained by forming the SIB into a film by a conventional method of forming a thermoplastic resin or a thermoplastic elastomer into a film, such as extrusion molding or calender molding.

(Thickness of Second Layer)

The thickness of a second layer is from 0.01 mm to 0.3 mm. The thickness of the second layer as used herein means the thickness of an SIS layer when the second layer is composed only of the SIS layer, the thickness of an SIB layer when the second layer is composed only of the SIB layer, or the total thickness of an SIS layer and an SIB layer when the second layer is composed of the SIS layer and the SIB layer. When the thickness of the second layer is less than 0.01 mm, the second layer may be broken by a pressing pressure upon vulcanization of a green tire in which a polymer laminate is used as an inner liner, and thus the vulcanization adhesive force may decrease. In contrast, when the thickness of the second layer is more than 0.3 mm, tire weight increases and fuel efficiency deteriorates. The thickness of the second layer is more preferably from 0.05 to 0.2 mm.

<Structure of Pneumatic Tire>

A pneumatic tire 1 in one embodiment of the present invention will be described with reference to FIG. 1.

Pneumatic tire 1 can be used as tires for passenger cars, trucks and buses, and heavy duty equipment. Pneumatic tire 1 includes a tread part 2, a side wall part 3 and a bead part 4. Furthermore, a bead core 5 is embedded in bead part 4. Also provided are a carcass 6 whose ends are respectively folded around bead core 5 and latched, that is provided from one bead part 4 to the other bead part, and a belt layer 7 composed of two plies outside a crown part of carcass 6. An inner liner 9 extending from one bead part 4 to the other bead part 4 is disposed on the tire radial inner surface of carcass 6. Belt layer 7 is disposed so that cords are mutually intersected between two plies composed of a cord such as a steel cord or an aramid fiber at an angle of usually 5 to 30° in a tire circumferential direction. Regarding the carcass, organic fiber cords made of polyester, nylon or aramid and the like are arranged at an angle of about 90° in tire circumferential direction, and a bead apex 8 extending from the top of bead core 5 in a side wall direction is disposed in the region surrounded by the carcass and the folded part thereof. An insulation can also be disposed between inner liner 9 and carcass 6.

<Polymer Laminate>

The structure of a polymer laminate will be described with reference to FIG. 1 to FIG. 5.

(Embodiment 1)

Figure 2:
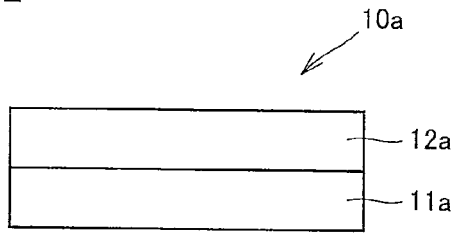
FIG. 2 is a schematic sectional view of a polymer laminate in one embodiment of the present invention.

As shown in FIG. 2, in one embodiment of the present invention, a polymer laminate 10a is composed of an SIBS layer 11a as the first layer and an SIS layer 12a as the second layer.

In FIG. 1, when polymer laminate 10a is used as inner liner 9 of pneumatic tire 1, if the surface existing in SIS layer 12a is disposed toward a tire radial outer surface so as to contact with carcass 6, the adhesive strength between SIS layer 12a and carcass 6 can be increased in a vulcanization step of the tire. Therefore, the resultant pneumatic tire 1 can have excellent air permeation resistance and durability since inner liner 9 is satisfactorily bonded with a rubber layer of carcass 6.

(Embodiment 2)

Figure 3:
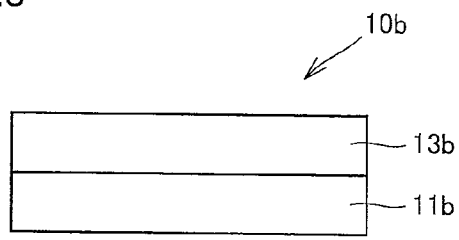
FIG. 3 is a schematic sectional view of a polymer laminate in one embodiment of the present invention.

As shown in FIG. 3, in one embodiment of the present invention, a polymer laminate 10b is composed of an SIBS layer 11b as the first layer and an SIB layer 13b as the second layer.

When polymer laminate 10b is used as inner liner 9 of pneumatic tire 1, if the surface existing in SIB layer 13b is disposed toward a tire radial outer surface so as to contact with carcass 6, the adhesive strength between SIB layer 13b and carcass 6 can be increased in a vulcanization step of the tire. Therefore, the resultant pneumatic tire 1 can have excellent air permeation resistance and durability since inner liner 9 is satisfactorily bonded with a rubber layer of carcass 6.

(Embodiment 3)

Figure 4:
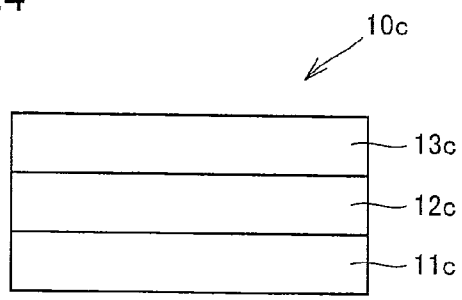
FIG. 4 is a schematic sectional view of a polymer laminate in one embodiment of the present invention.

As shown in FIG. 4, in one embodiment of the present invention, a polymer laminate 10c is composed of an SIBS layer 11c as the first layer, and an SIS layer 12c and an SIB layer 13c as a second layer, that are laminated in the order described above.

When polymer laminate 10c is used as inner liner 9 of pneumatic tire 1, if the surface existing in SIB layer 13c is disposed toward a tire radial outer surface so as to contact with carcass 6, the adhesive strength between SIB layer 13c and carcass 6 can be increased in a vulcanization step of the tire. Therefore, the resultant pneumatic tire 1 can have excellent air permeation resistance and durability since inner liner 9 is satisfactorily bonded with a rubber layer of carcass 6.

(Embodiment 4)

Figure 5:
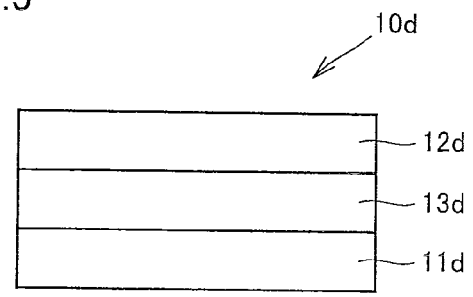
FIG. 5 is a schematic sectional view of a polymer laminate in one embodiment of the present invention.

As shown in FIG. 5, in one embodiment of the present invention, a polymer laminate 10d is composed of an SIBS layer 11d as the first layer, and an SIB layer 13d and an SIS layer 12d as a second layer, that are laminated in the order described above.

When polymer laminate 10d is used as inner liner 9 of pneumatic tire 1, if the surface existing in SIS layer 12d is disposed toward a tire radial outer surface so as to contact with carcass 6, the adhesive strength between SIS layer 12d and carcass 6 can be increased in a vulcanization step of the tire. Therefore, the resultant pneumatic tire 1 can have excellent air permeation resistance and durability since inner liner 9 is satisfactorily bonded with a rubber layer of carcass 6.

<Method for Producing Polymer Laminate>

A polymer laminate can be obtained by lamination extrusion such as laminate extrusion or coextrusion of an SIBS layer, and at least one of an SIS layer and an SIB layer in the order described in, for example, any one of Embodiments 1 to 4.

<Method for Producing Pneumatic Tire>

In one embodiment of the present invention, pneumatic tire 1 can be produced by using the polymer laminate produced by using the method for producing a polymer laminate as an inner liner part of a green tire of pneumatic tire 1, followed by vulcanization molding along with other members. When the polymer laminate is disposed on the green tire, it is disposed toward the tire radial outer surface so that the SIS layer or the SIB layer as the second layer of the polymer laminate is contacted with carcass 6. When the polymer laminate is disposed in such a manner, in a tire vulcanization step, the adhesive strength between the SIS layer or the SIB layer and carcass 6 can be increased. Therefore, the resultant pneumatic tire 1 can have excellent air permeation resistance and durability since inner liner 9 is satisfactorily bonded with the rubber layer of carcass 6.

Also when an insulation is disposed between inner liner 9 and carcass 6, it is possible to increase the adhesive strength between inner liner 9 and the insulation by disposing the SIS layer or the SIB layer as the second layer of the polymer laminate toward the tire radial outer surface so as to contact with the insulation.

EXAMPLES

Examples 1 to 20, Comparative Examples 1 to 4

(Preparation of SIB)

In a 2 L reaction vessel equipped with a stirrer, 589 mL of methylcyclohexane (dried over molecular sieves), 613 mL of n-butyl chloride (dried over molecular sieves) and 0.550 g of cumyl chloride were added. After cooling the reaction vessel to −70° C., 0.35 mL of α-picoline(2-methylpyridine) and 179 mL of isobutylene were added. Furthermore, 9.4 mL of titanium tetrachloride was added and polymerization was initiated, and then the solution was reacted for 2.0 hours while stirring at −70° C. Next, 59 mL of styrene was added to the reaction vessel and the reaction was continued for 60 minutes, and then the reaction was terminated by adding a large amount of methanol. After removing the solvent from the reaction solution, a polymer was dissolved in toluene and washed twice with water. This toluene solution was added to the methanol mixture, thereby precipitating a polymer, and the resultant polymer was dried at 60° C. for 24 hours to obtain a styrene-isobutylene diblock copolymer.

(Production of Polymer Laminate)

An SIBS (SIBSTAR 102T (Shore A hardness of 25, styrene unit content of 25% by mass), manufactured by Kaneka Corporation) was pelletized by a twin screw extruder (screw diameter: Φ50 mm, L/D: 30, cylinder temperature: 220° C.).

An SIS (D1161JP (styrene unit content of 15% by mass), manufactured by Kraton Polymers) was pelletized by a twin screw extruder (screw diameter: Φ50 mm, L/D: 30, cylinder temperature: 220° C.).

Using an SIB prepared by using the above method for preparing an SIB as the SIB, the SIB was pelletized by a twin screw extruder (screw diameter: Φ50 mm, L/D: 30, cylinder temperature: 220° C.).

The resultant pellets of the SMS, the SIS and the SIB were coextruded to obtain polymer laminates, each having a thickness shown in Table 1, of Examples 1 to 20 and Comparative Examples 1 to 4. In the polymer laminates of Examples 17 to 20, the SIS layer and the SIB layer are laminated on the SIBS layer in the order described above.

In Comparative Example 1, 90 parts by mass of chlorobutyl (Exxon chlorobutyl 1068, manufactured by Exxon Mobil Corporation), 10 parts by mass of a natural rubber (NR, TSR20) and 50 parts by mass of a filler ("SEAST V" (N660, nitrogen-adsorption specific surface area: 27 m$^2$/g, manufactured by Tokai Carbon Co., Ltd.) were mixed by a Banbury mixer and then formed into a sheet by a calender roll to obtain a polymer film having a thickness of 1.0 mm.

Using the polymer laminates of Examples 1 to 20 and Comparative Examples 2 to 4, and the polymer film of Comparative Example 1, the following tests were performed.

<Peeling Test>

The resultant polymer laminate or polymer sheet and a rubber sheet for a carcass (component: a natural rubber and an SBR) were laid one upon another, followed by heating under pressure at 170° C. for 12 minutes to obtain a test piece for peeling. They were laid one upon another so that an SIS layer or an SIB layer is contacted with the rubber sheet. Using the resultant test piece, a peeling test was performed in accordance with JIS K 6256 "Vulcanized Rubber and Thermoplastic Rubber—How to Determine Adhesion" and an adhesive force between the inner liner and the carcass (IL/carcass adhesive force) was measured. The size of the test piece was 25 mm in width and the peeling test was performed at room temperature of 23° C.

The larger the adhesive force between the inner liner (IL) and the carcass is, the more preferred it is.

<Flexural Fatigue Test>

In accordance with JIS K 6260 "De Mattia Flex Cracking Test of Vulcanized Rubber and Thermoplastic Rubber", a polymer laminate or a polymer film was applied to a rubber, followed by vulcanization to obtain a predetermined test piece with a groove in the center. After notching the test piece at the center of the groove in advance, a test of repeatedly applying flexural deformation and measuring crack growth was performed. The crack length was measured at the repeated number of 700,000, 1,400,000, and 2,100,000 times under the conditions of an atmospheric temperature of 23° C., a strain of 30% and a period of 5 Hz, and then the repeated number of flexural deformation required for the crack growth of 1 mm was calculated. The resultant numerical value was expressed by an index (the value of Comparative Example 1 is regarded as a reference (100)) by the following equation with respect to flexural fatigue properties of the polymer laminates of Examples 1 to 20 and Comparative Examples 2 to 4. The larger the numerical value is, the harder the cracks grow and the more excellent the performance is.

(Flexural fatigue index)=(Repeated number of flexural deformation of Examples 1 to 20 and Comparative Examples 2 to 4)/(Repeated number of flexural deformation of Comparative Example 1)×100

(Production of Pneumatic Tire)

The thus produced polymer laminates of Examples 1 to 20 and Comparative Examples 2 to 4, and the polymer film of Comparative Example 1 were used as an inner liner part of a tire to produce a green tire. The polymer laminate was disposed so that the second layer is contacted with the carcass. Next, in the vulcanization step, a 195/65R15 pneumatic tire was produced by press molding at 170° C. for 20 minutes. The resultant pneumatic tire was subjected to a static air pressure drop test.

<Static Air Pressure Drop Rate Test>

The 195/65R15 steel radial PC tire was mounted on a JIS standard rim (15×6JJ) and an initial air pressure of 300 Kpa was applied. After standing at room temperature for 90 days, a drop rate of an air pressure was calculated.

The results are shown in Table 1.

<Evaluation Results>

In Examples 1 to 4, a polymer laminate composed of an SIBS layer (thickness of 0.30 to 0.59 mm) as the first layer and an SIS layer (thickness of 0.01 to 0.30 mm) as the second layer was used. All polymer laminates of Examples 1 to 4 were thinner than that made of a conventional rubber composition for an inner liner of Comparative Example 1, but were excellent in flexural fatigue properties and static air pressure drop rate while maintaining a comparable peel force.

In Examples 5 to 8, a polymer laminate composed of an SIBS layer (thickness of 0.30 to 0.59 mm) as the first layer and an SIB layer (thickness of 0.01 to 0.30 mm) as the second layer was used. All polymer laminates of Examples 5 to 8 were thinner than that made of a conventional rubber composition for an inner liner of Comparative Example 1, but were excellent in flexural fatigue properties and static air pressure drop rate while maintaining a comparable peel force.

In Examples 9 to 12, a polymer laminate composed of an SIBS layer (thickness of 0.05 to 0.50 mm) as the first layer and an SIS layer (thickness of 0.01 mm) as the second layer was used. The polymer laminates of Examples 9 to 11 were slightly inferior in peel force as compared with that made of a conventional rubber composition for an inner liner of Comparative Example 1, but were excellent in flexural fatigue properties and static air pressure drop rate. The polymer laminate of Example 12 is slightly inferior in peel force as compared with that of Comparative Example 1, but was a very thin

TABLE 1

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Laminate structure | IIR/NR/Filler layer (mm) | — | — | — | — | — | — | — | — | — | — | — | — |
| | First layer (SIBS layer) (mm) | 0.59 | 0.50 | 0.40 | 0.30 | 0.59 | 0.50 | 0.40 | 0.30 | 0.50 | 0.40 | 0.10 | 0.05 |
| | Second layer (SIS layer) (mm) | 0.01 | 0.10 | 0.20 | 0.30 | — | — | — | — | 0.01 | 0.01 | 0.01 | 0.01 |
| | (SIB layer) (mm) | — | — | — | — | 0.01 | 0.10 | 0.20 | 0.30 | — | — | — | — |
| Evaluation | Peel force index | 90 | 100 | 100 | 100 | 90 | 100 | 100 | 100 | 90 | 90 | 90 | 90 |
| | Flexural fatigue index | 110 | 105 | 103 | 103 | 110 | 105 | 103 | 103 | 105 | 103 | 102 | 100 |
| | Static air pressure drop rate (%/month) | 2.5 | 2.6 | 2.7 | 2.8 | 2.5 | 2.6 | 2.7 | 2.8 | 2.6 | 2.7 | 3.0 | 3.2 |

| | | Examples | | | | | | | | Comparative Examples | | | |
|---|---|---|---|---|---|---|---|---|---|---|---|---|---|
| | | 13 | 14 | 15 | 16 | 17 | 18 | 19 | 20 | 1 | 2 | 3 | 4 |
| Laminate structure | IIR/NR/Filler layer (mm) | — | — | — | — | — | — | — | — | 1.00 | — | — | — |
| | First layer (SIBS layer) (mm) | 0.5 | 0.4 | 0.1 | 0.05 | 0.5 | 0.5 | 0.1 | 0.1 | — | 0.60 | — | 0.04 |
| | Second layer (SIS layer) (mm) | — | — | — | — | 0.1 | 0.01 | 0.1 | 0.01 | — | — | 0.1 | 0.05 |
| | (SIB layer) (mm) | 0.01 | 0.01 | 0.01 | 0.01 | 0.1 | 0.01 | 0.1 | 0.01 | — | — | 0.1 | — |
| Evaluation | Peel force index | 90 | 90 | 90 | 90 | 100 | 100 | 90 | 90 | 100 | 10 | 120 | 95 |
| | Flexural fatigue index | 105 | 103 | 102 | 100 | 104 | 106 | 102 | 102 | 100 | 110 | 130 | 97 |
| | Static air pressure drop rate (%/month) | 2.6 | 2.7 | 3.0 | 3.2 | 2.6 | 2.6 | 3.0 | 3.0 | 3.2 | 2.5 | 5.5 | 3.4 | polymer laminate, and thus comparable flexural fatigue properties and static air pressure drop rate were obtained.

In Examples 13 to 16, a polymer laminate composed of an SIBS layer (thickness of 0.05 to 0.5 mm) as the first layer and an SIB layer (thickness of 0.01 mm) as the second layer was used. The polymer laminates of Examples 13 to 15 were thinner and slightly inferior in peel force as compared with that made of a conventional rubber composition for an inner liner of Comparative Example 1, but were excellent in flexural fatigue properties and static air pressure drop rate. The polymer laminate of Example 16 was slightly inferior in peel force as compared with that of Comparative Example 1, but was a very thin polymer laminate, and thus comparable flexural fatigue properties and static air pressure drop rate were obtained.

In Examples 17 to 20, a polymer laminate composed of an SIBS layer (thickness of 0.1 to 0.5 mm) as the first layer, and an SIS layer (thickness of 0.01 to 0.1 mm) and an SIB layer (thickness of 0.01 to 0.1 mm) as the second layer was used. All polymer laminates of Examples 17 to 20 were thinner than that made of a conventional rubber composition for an inner liner of Comparative Example 1, but were excellent in flexural fatigue properties and static air pressure drop rate while maintaining a comparable peel force.

In Comparative Example 1, an inner liner was produced by using a conventional rubber composition for an inner liner, containing a natural rubber and a butyl rubber, and was used as a reference.

In Comparative Example 2, a polymer laminate composed only of an SIBS layer (thickness of 0.6 mm) was used. The polymer laminate was excellent in flexural fatigue properties and static air pressure drop rate, but was very inferior in peel force.

In Comparative Example 3, a polymer laminate composed of an SIS layer (thickness of 0.1 mm) and an SIB layer (thickness of 0.1 mm) was used. The polymer laminate was excellent in peel force and flexural fatigue properties, but was inferior in static air pressure drop rate.

In Comparative Example 4, a polymer laminate composed of an SIBS layer (thickness of 0.04 mm) and an SIS layer (thickness of 0.05 mm) was used. The polymer laminate was inferior in all of peel force, flexural fatigue properties and static air pressure drop rate as compared with that of Comparative Example 1.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A pneumatic tire using, as an inner liner, a polymer laminate comprising a first layer having a thickness of 0.05 mm to 0.6 mm and consisting essentially of a styrene-isobutylene-styrene triblock copolymer, and a second layer having a thickness of 0.01 mm to 0.3 mm and consisting essentially of a styrene-isobutylene diblock copolymer.

2. The pneumatic tire according to claim 1, wherein said second layer is disposed toward a tire radial outer surface in said polymer laminate.

3. The pneumatic tire according to claim 1, wherein said styrene-isobutylene-styrene triblock copolymer has a weight average molecular weight of 50,000 to 400,000, and also has a styrene unit content of 10 to 30% by mass.

4. The pneumatic tire according to claim 1, wherein said styrene-isobutylene diblock copolymer is linear and has a weight average molecular weight of 40,000 to 120,000, and also has a styrene unit content of 10 to 35% by mass.

* * * * *